Patented June 21, 1938

2,121,018

UNITED STATES PATENT OFFICE 2,121,018

CERAMIC

Mitchell Carter and Gustav Heinz, Trenton, N. J.; said Carter assignor to Edward B. Carter, Morrisville, Pa.

No Drawing. Application July 18, 1936, Serial No. 91,427

8 Claims. (Cl. 106—9)

This invention relates to ceramics.

It is an object of the invention to provide improved methods for the manufacture of ceramic articles such as pottery, china, porcelain, earthenware, stoneware, terra-cotta, tile, refractories, abrasives and the like.

In the manufacture of such articles, the ceramic materials are shaped or formed in any desired manner, as by hand throwing, pressing or casting, for example, and the shaped articles or bodies are then dried and fired. In certain classes of articles, such as china or terra-cotta, for example, which include a large proportion of clay in the mix, the clay serves partly as a binder and small articles formed from such mixes will hold their shape sufficiently to permit them to be handled and moved without serious danger of damage. In the case of larger articles or articles with thin walls great care must be exercised in handling to avoid damage to the articles before they are fired, and even with the greatest care, a high proportion of such articles are spoiled before they can be fired.

In other classes of articles such as high grade refractories, for example, it has been customary to add clay or similar material to the refractory material, and the clay has served two purposes, first, as a binder for the article prior to firing, and second, as a binder or flux for the finished fired article. It has been recognized that relatively small proportions of clay were sufficient for the second purpose, but much larger proportions were required for the first purpose. Accordingly, it has been the practice to use more clay than was necessary or desirable in the final product in order to bind the refractory material together prior to firing. It is common practice to mix as much as 20% clay with the refractory material, and this high proportion reduces seriously the effectiveness of the refractory material. Furthermore, when this proportion of clay or even less clay is used, it is impossible to cast such mixtures and other methods of shaping or forming have had to be resorted to.

According to the present invention we propose to use latex as a binder for ceramic bodies or articles prior to firing the said bodies, it being recognized that latex, being an organic substance, burns out of said bodies when they are fired without changing the characteristics of the fired body, and that the latex does not perform any binding function in the finished article.

The latex performs a very useful function as a binder in various types of ceramic bodies. When used as a binder in articles formed from a mix which includes a large amount of clay for example, the formed articles, prior to firing, are much stronger and more resistant to damage from handling than similar articles without latex. Furthermore, when latex is used as a binder for articles such as high grade refractories, it is possible to reduce the amount of clay ordinarily required, the latex serving to bind the material together until the article is fired. When using latex as a binder for such bodies, it is possible to prepare mixes of sufficient fluidity to permit casting.

The proportion of latex to ceramic materials may vary considerably depending on the nature of the bodies to be formed therefrom and the extent to which it is desired to strengthen such bodies. As little as 1 part (dry rubber content) latex to 100 parts dry ceramic materials by weight is sufficient in some cases, but in general we find that approximately 1 part (dry rubber content) latex to 10 parts dry ceramic materials is ample to give satisfactory results.

Inasmuch as difficulty may be encountered in mixing certain ceramic materials with latex without causing coagulation of the latter to an extent sufficient to prevent proper mixing, we propose a method of mixing which precludes such difficulties. A feature of this method is the use of a relatively small amount of a protective colloid which may under some circumstances be mixed with the latex before the ceramic materials are mixed therewith, but which is preferably mixed with the ceramic materials before said materials are mixed with the latex.

There are a considerable number of protective colloids such as glue, casein, gelatine, soap and the like which will permit mixture of the ceramic materials with latex without coagulation and which are satisfactory for some purposes, as when the mix is to be used in forming processes other than casting in porous molds. When the mix is to be cast in porous molds I prefer to use as a protective colloid one of a group of substances offered to the rubber trade for use with latex under trade names such as "Saprotin" or "Stabalex", which are described as sulphonated naphthalene or benzol derivatives.

In the practice of our process we prefer to prepare a solution of protective colloid in water, then to add the dry ceramic materials to said solution, and then to add this mixture to the latex. For example a 25% solution of protective colloid in water is convenient to mix, and the dry ceramic may be added directly to this solution. It will be understood, however, that this procedure may be varied in some cases, although we have found that uniformly good results may be obtained by proceeding in this manner.

Relatively small quantities of protective colloid are sufficient to prevent coagulation of the latex, although the quantity will vary somewhat depending on the protective value of the particular colloid chosen and on the composition of the ceramic materials used. The quantity required may be easily determined by test with respect to any given mixture. However, an excess of protective colloid is not harmful and is sometimes used as a precautionary measure.

The quantity of water used depends on the character of the mix which is desired. If a plastic mix is desired approximately 8% water is used, while if a fluid mix is desired for casting 25 to 30% water is used.

As a specific example of the practice of the process in connection with a well-known ceramic mixture used for the manufacture of china, the following may be considered:

| | Parts |
|---|---|
| Clay | 50 |
| Flint | 30 |
| Feldspar | 20 |
| 25% Saprotin solution | 5 |
| Water | 40 |
| 60% latex | 10 |

In mixing the foregoing ingredients, it is preferable to add the dry ceramic materials to the Saprotin solution, and then to add this mixture to the latex while stirring the same. The resulting mix will be of a creamy free-flowing consistency and suitable for casting by usual methods. If it is desired to provide a plastic mix for forming by other methods, it would merely be necessary to reduce the quantity of water to whatever extent is necessary to obtain the desired plasticity. It will be understood that other ceramic materials may be used in place of those specifically named, and that the proportion of such materials may be varied as desired in order to secure the desired characteristics in the finished product.

As a second example of the practice of the process as applied to the manufacture of high grade refractories, the following may be considered:

| | Parts |
|---|---|
| Silimanite | 90 |
| Clay | 10 |
| 25% Saprotin solution | 4 |
| Water | 19 |
| 60% latex | 10 |

Preferably the same order of mixing is followed as before, namely, the dry ceramic materials are added to the Saprotin solution, and then the mixture is added to the latex. The resulting mixture is sufficiently fluid to be poured readily and accordingly can be cast without difficulty. It will be understood that refractory materials other than Silimanite may be used, as for example, carborundum, corundum, alundum, fused silica, graphite and the like, from which can be made articles such as grinding wheels, crucibles, bricks, blocks, filter plates and other like articles containing refractory materials which in themselves will fail to bond when subjected to firing temperatures except in the presence of a suitable permanent binder or flux.

When ceramic bodies are formed from a mix containing latex as previously described, they are found to be much more resistant to breakage or other damage than ordinary mixes. With large cast ceramic bodies or more especially with bodies having thin walls, where ordinarily a large proportion of the original castings have to be discarded because of imperfections or damage, the proportion of usable castings can be increased considerably by using latex in the mix.

In the case of refractory bodies, moreover, the use of latex permits a reduction in the proportion of clay used in the mix, with the result that it is possible to provide a free flowing mixture which can be cast, and also that the characteristics of the finished article are improved.

After the ceramic bodies containing latex are formed in any desired manner, they are dried and fired in accordance with usual practice. Suitable allowance should be made for shrinkage in view of the fact that the latex in the bodies is completely burned out during the firing.

It will be understood that the term "latex" as used herein includes not only the various types of commercial rubber latex now available, including the so-called pre-vulcanized latex, but also other dispersions of material or synthetic rubber solids in liquids.

It will be understood that the invention may be variously modified and embodied within the scope of the subjoined claims.

We claim as our invention:

1. Process of making ceramic articles which comprises mixing ceramic materials with latex in quantity sufficient to serve as a temporary binder therefor prior to firing, forming articles from said mix, and firing said articles to burn out the latex.

2. Process of making ceramic articles which comprises mixing ceramic materials with latex, forming articles from said mix, drying said articles, and firing said articles to burn out the latex.

3. Process of making ceramic articles which comprises mixing ceramic materials with latex, in the presence of a protective colloid and water, forming articles from said mix, drying said articles, and firing said articles to burn out the latex.

4. Process of making ceramic articles which comprises mixing ceramic materials with latex, in the presence of a protective colloid and sufficient water to provide a fluid free flowing mixture, casting articles from said mix, drying said articles, and firing said articles to burn out the latex.

5. Process of making ceramic articles which comprises mixing ceramic materials including refractory material and ceramic bond with latex in quantity sufficient to serve as a temporary binder therefor prior to firing, forming articles from said mix, and firing said articles to burn out the latex and fuse said ceramic bond.

6. Process of making ceramic articles which comprises mixing ceramic materials including refractory material and ceramic bond with latex, forming articles from said mix, drying said articles, and firing said articles to burn out the latex and fuse said ceramic bond.

7. Process of making ceramic articles which comprises mixing ceramic materials including refractory material and ceramic bond with latex, in the presence of a protective colloid and water, forming articles from said mix, drying said articles, and firing said articles to burn out the latex and fuse said ceramic bond.

8. Process of making ceramic articles which comprises mixing ceramic materials including refractory material and ceramic bond with latex, in the presence of a protective colloid and sufficient water to provide a fluid free flowing mixture, casting articles from said mix, drying said articles, and firing said articles to burn out the latex and fuse said ceramic bond.

MITCHELL CARTER.
GUSTAV HEINZ.